United States Patent [19]
Hasegawa et al.

[11] Patent Number: 6,064,734
[45] Date of Patent: *May 16, 2000

[54] TELEPHONE WITH SLIDING KEYPAD

[75] Inventors: Yutaka Hasegawa; Nicholas Brawne, both of San Francisco, Calif.

[73] Assignees: Sony Corporation of Japan, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/975,951

[22] Filed: Nov. 21, 1997

[51] Int. Cl.⁷ ........................................................ H04M 1/00
[52] U.S. Cl. ................................................................ 379/433
[58] Field of Search .................................... 379/433, 428, 379/434; 455/90, 575

[56] References Cited

U.S. PATENT DOCUMENTS

| | | | |
|---|---|---|---|
| D. 326,451 | 5/1992 | Roegner | 379/433 |
| 5,109,539 | 4/1992 | Inubushi et al. | 379/433 |
| 5,440,629 | 8/1995 | Gray | 379/433 |
| 5,493,604 | 2/1996 | Hirayama | 379/433 |

*Primary Examiner*—Jack Chiang
*Attorney, Agent, or Firm*—Wagner, Murabito & Hao LLP

[57] ABSTRACT

A telephone which includes a keypad housing. The keypad housing slides in and out of an opening in the telephone. In the retracted position, the keypad housing is held within the opening. This gives a telephone which is small and compact. In fact, the telephone of the present invention is small and compact enough to fit within a user's pocket. The keypad housing may be pulled out and latched in the extended position. In the extended position, the user has access to the keypad which is disposed in the top of the keypad housing. The resulting telephone is small and compact when the keypad housing is retracted, yet allows for the user access to a full sized keypad when the keypad housing is extended.

14 Claims, 11 Drawing Sheets

TELEPHONE WITH SLIDING KEYPAD

TECHNICAL FIELD

This invention relates to the field of communication devices. More specifically, the present invention relates to the field of telephone devices.

BACKGROUND ART

Early cellular telephones included large housings which contained large and heavy batteries and extensive electronic circuitry. As cellular telephones developed over the years, their size has steadily decreased. This has been partly due to the integration of electronic functions into semiconductor devices such as digital signal processors specifically designed to process the electrical operations of a cellular telephone. In addition, smaller, more powerful batteries have been developed.

Though cellular telephones have become smaller and smaller, the typical cellular telephone is still larger than a user's pocket. This requires a user to either carry the cellular telephone in a bag or briefcase, or carry the cellular telephone in his hand. However, these methods of carrying a cellular telephone are not as convenient as carrying the cellular telephone in the user's pocket. Thus, cellular telephone manufacturers have attempted to make cellular telephones which will fit into a user's pocket.

One limiting factor in making cellular telephones smaller is the form and function requirements relating to operation of the telephone. One of these requirements is that the user must be able to speak into a microphone and simultaneously listen to sounds from a speaker.

Another limiting factor in making cellular telephones smaller is the telephone display. A cellular telephone must generally have a display of a sufficient size so as to allow a user to easily see displayed data. The display must be located such that a user may readily see the display. Thus, displays are typically located on the front surface of the telephone.

Most cellular telephones include function keys. These flnction keys are typically used to initiate calls and to end calls. Some designs also include function keys which are used for other various purposes. These function keys must be conveniently located since they are frequently used. Thus, function keys are typically located on the front surface of the telephone.

Prior art cellular telephones typically include a keypad which is located on the front surface of the telephone. The keypad is used to enter in the number to be dialed. The keypad also limits the size of the telephone since the keypad must be of a sufficient size so as to allow a user to easily enter numbers by manually operating the keys of the keypad. A keypad which is of a sufficient size so as to allow for easy operation (a full size keypad) is relatively large. Since keypads are typically placed on the front of the telephone, much of the front surface of the telephone is taken up by the keypad. This leaves little room for the speaker, the display and any function keys.

Some prior art telephone designs allow a user to input names and phone numbers of frequently called numbers. The user may then scroll through the names and phone numbers either using the keypad or using one or more dedicated function keys. However, since most of the front surface of the telephone is taken up by the keypad and function keys, there is little room left for a display. Thus, most prior art telephones have very small displays. Typically, these prior art displays only have room enough for a one-line display as a user scrolls through the numbers. This makes the function of scrolling through stored names and numbers a difficult and time consuming process. For this reason, many users do not use the stored frequently called numbers to make a call. Instead, they simply remember the frequently called numbers or look them up prior to manually dialing the number using the keys of the keypad.

What is needed is a cellular telephone which is small enough to fit into a user's pocket and which includes an adequately sized display and an adequately sized keypad. In addition, a telephone which is easy to use and which is designed such that a user may easily use stored names and numbers to make calls. The present invention meets the above needs.

DISCLOSURE OF THE INVENTION

The present invention provides a telephone which is easy to operate and which is small enough to fit within a user's pocket. In addition, the telephone of the present invention includes a large size display and a full size keypad.

A telephone which includes a telephone body and a keypad housing is disclosed. The keypad housing fits within an opening located on the bottom of the telephone body. The keypad housing is coupled to the telephone body such that the keypad housing may be slid in and out relative to the telephone body such that the keypad housing may be moved from a retracted position to an extended position.

In the retracted position the keypad housing fits within the opening in the telephone body such that the telephone has a small size and a compact profile. The keypad housing may be extended by pulling down on a microphone which is attached to the keypad housing. A keypad is exposed when the keypad housing is extended. Because the keypad housing is disposed within the telephone body, there is sufficient room for a full sized keypad.

The keypad housing is only allowed to move within a limited range between a retracted position and an extended position. Detents formed in the keypad housing engage an indentation in the telephone body so as to hold the keypad housing in the retracted position and in the extended position.

A speaker, a display, an antenna, a battery, a selection switch and function keys are also disposed in the telephone body. Because the keypad is not located on the front surface of the telephone body, a telephone body having a small size is obtained. In addition, there is enough room for a large display. There is also plenty of room for function keys.

In operation, a user may input names and phone numbers using the keypad. In addition, names and phone numbers may be downloaded from a computer. The names and numbers are stored in non-volatile memory. The user may operate the selection switch to scroll through stored names and phone numbers so as to select a number to be called. A call may be initiated by pressing a function key designated as the send key. The call may then be ended by pressing a function key designated as the end key.

When the keypad housing is in the retracted position, the telephone is small and compact enough to fit within a user's pocket. The keypad housing only needs to be extended when a new name and number is to be input or when the user wishes to access the keypad for any other reason. The resulting telephone has a compact profile and is easy to use.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
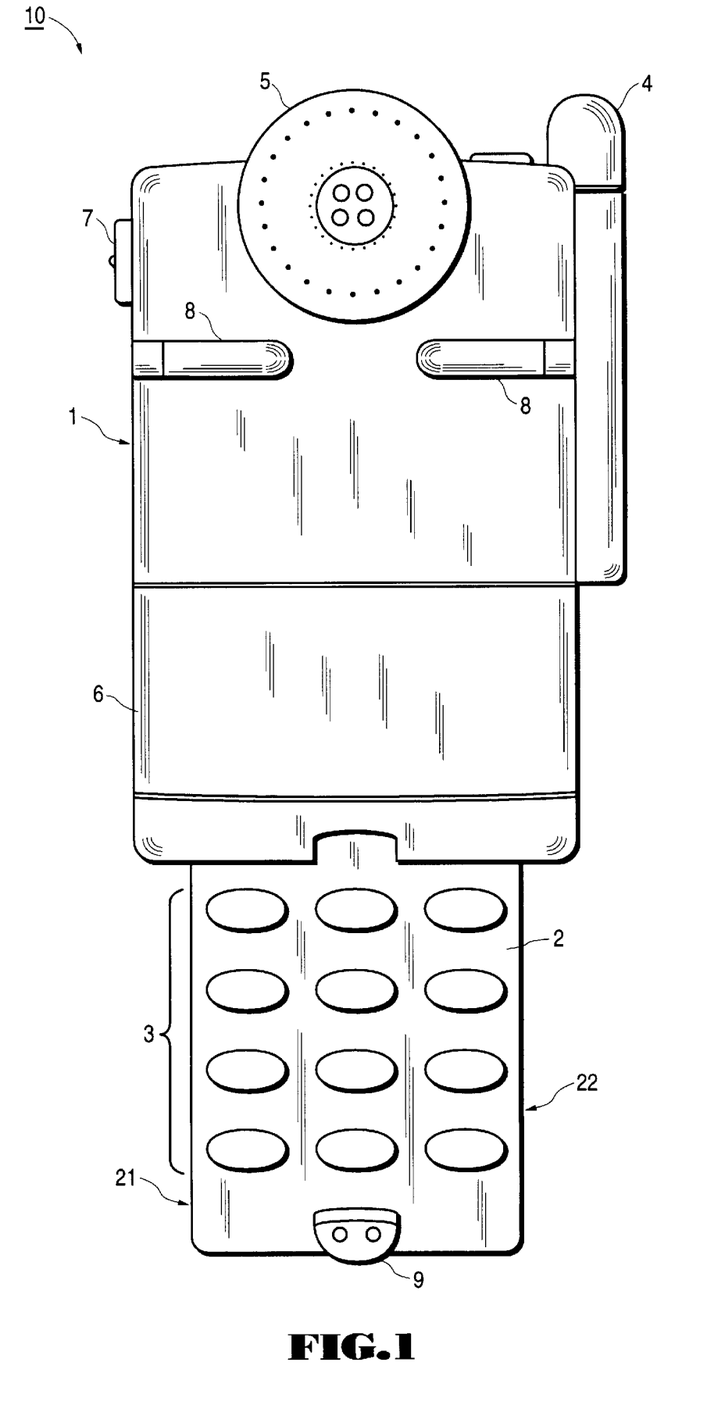
FIG. 1 is a front view of a telephone having a keypad housing in the extended position in accordance with the present claimed invention.

FIG. 1 shows telephone 10 which includes telephone body 1 and keypad housing 2. In one embodiment, telephone body 1 includes a housing which is formed of plastic. Keypad 3 is disposed within keypad housing 2 such that keys extend from keypad housing 2. In one embodiment, keypad 3 is a standard, full-size, 12-key alphanumeric keypad.

Electronic circuitry (not shown) is contained within telephone body 1 which electrically connects to keypad 3. This allows a user to input data into telephone 10 by operating keypad 3. In one embodiment, telephone 10 is programmable such that frequently used phone numbers may be stored electronically within the electronic circuitry of telephone 10 by operating the alphanumeric keys of keypad 3.

Continuing with FIG. 1, telephone body 1 is also shown to include an antenna 4 which is coupled to the electronic circuitry of telephone 10. Antenna 4 receives and transmits radio signals which are coupled between antenna 4 the electronic circuitry of telephone 10. This allows a user to operate telephone 10 and provides for communication between telephone 10 and a cellular transmission and reception facility.

Display 6 is shown to be disposed within telephone body 1 such that display 6 may be easily seen by a user. Display 6 is electrically coupled to the electronic circuitry of telephone 10 such that data may be displayed thereon and viewed by a user. In one embodiment, names and phone numbers may be programmed into telephone 10 and viewed on display 6. In addition, phone numbers entered by operating keypad 3 are displayed on display 6. Display 6 is a large display which is easy for a user to see. In one embodiment, depending on the size of the characters displayed, display 6 is sufficiently large to display 6–10 lines of text.

Telephone body 1 of FIG. 1 also includes function keys 8. In the embodiment shown in FIG. 1, two function keys 8 are shown to extend from telephone body 1. However, any number of function keys could be used depending on the requirements of the particular telephone design. Function keys 8 are connected to the electronic circuitry of telephone 10. In one embodiment, function keys 8 include a send key which is operable by a user to initiate a cellular connection, and an end key which is operable by a user to end transmission and disconnect a cellular connection.

Continuing with FIG. 1, telephone body 1 also includes speaker 5. Speaker 5 is electrically connected to the electronic circuitry of telephone 10 such that sound is projected from speaker 5 during the operation of telephone 10.

Still continuing with FIG. 1, telephone 10 also includes a microphone 9. In one embodiment, microphone 9 is attached to keypad housing 2. Microphone 9 is electrically connected to the electronic circuitry of telephone 10 such that a user may input audible sound through microphone 9 by speaking into microphone 9. Microphone 9 is located near the bottom of keypad housing 2 such that the distance between microphone 9 and speaker 10 is sufficient to allow a user to place speaker 5 near the user's ear and microphone 9 near the user's mouth. This allows a user to communicate with others by speaking into microphone 9 and listening through speaker 5.

Referring still to FIG. 1, telephone body 1 also includes selection switch 7. Selection switch 7 is coupled to the electronic circuitry of telephone 10. In one embodiment selection switch 7 is a rotary switch which allows a user to scroll through data items displayed on display 6.

Alternatively, the functions of function keys 8 are performed using selection switch 7 and/or by using scroll keys in conjunction with the display of data items on display 6.

Figure 2:
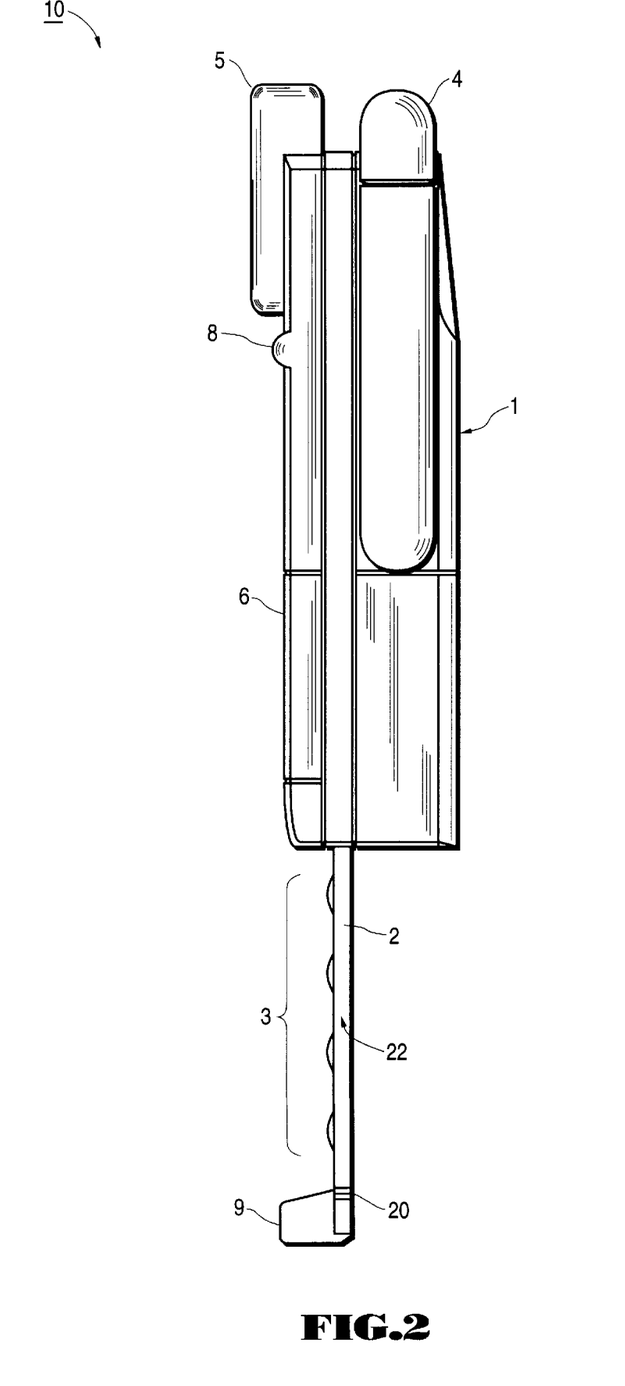
FIG. 2 is side view of a telephone having a keypad housing in the extended position in accordance with the present claimed invention.

With reference to FIG. 2, keypad housing 2 is thinner than the side of telephone body 1 such that keypad housing 2 may be extended into and retracted from a recession formed in telephone body 1. A latching mechanism is provided for holding keypad housing 2 in the retracted position and in the extended position. In one embodiment the latching mechanism includes a detent such as detent 20 which extends from side surface 22 of keypad housing 2. In one embodiment, keypad housing 2 is plastic and detent 20 is a bump molded into side surface 22 of keypad housing 2.

Figure 3:
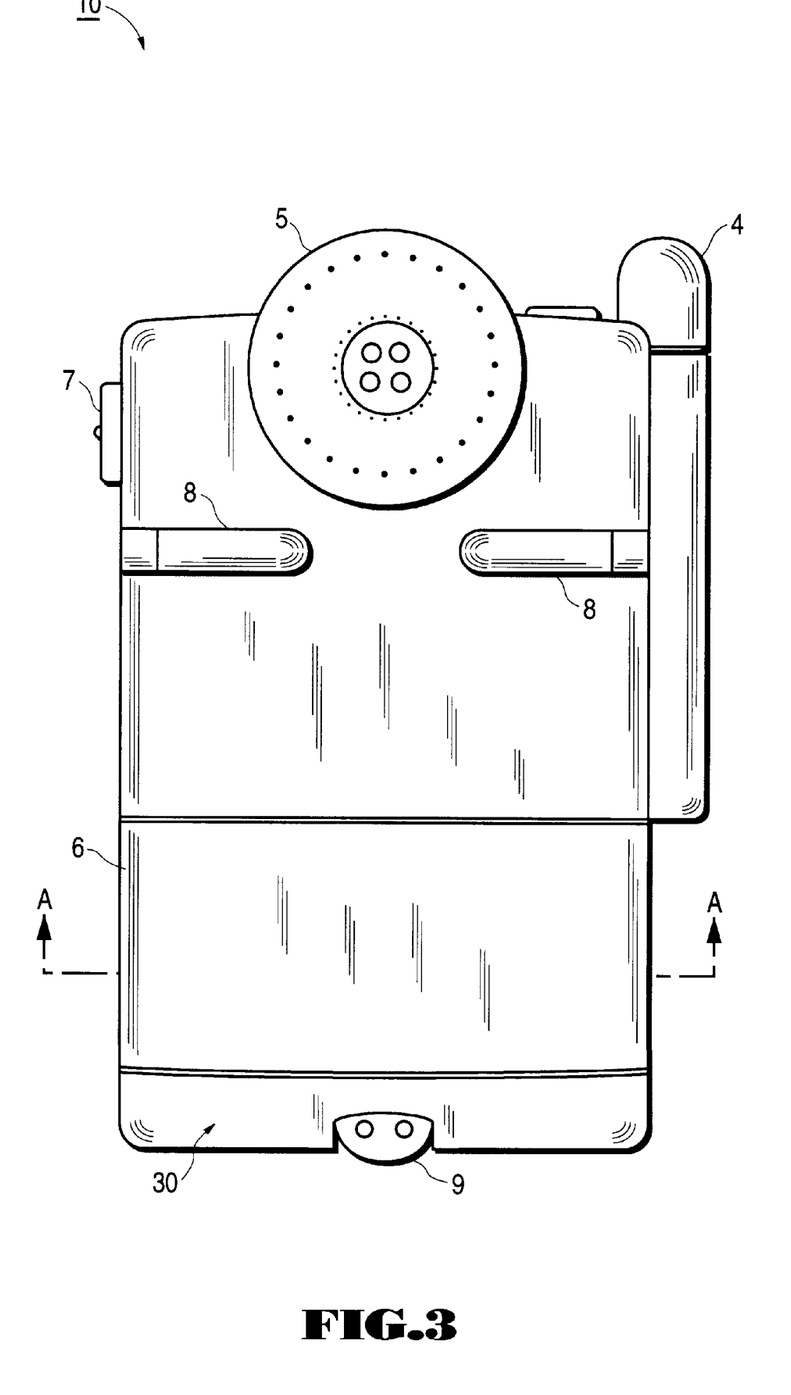
FIG. 3 is a front view of a telephone having a keypad housing in the retracted position in accordance with the present claimed invention.

FIG. 3 shows keypad housing 2 in the retracted position. In one embodiment, microphone 9 fits within an inset in top surface 30 of telephone body 1.

Figure 4:
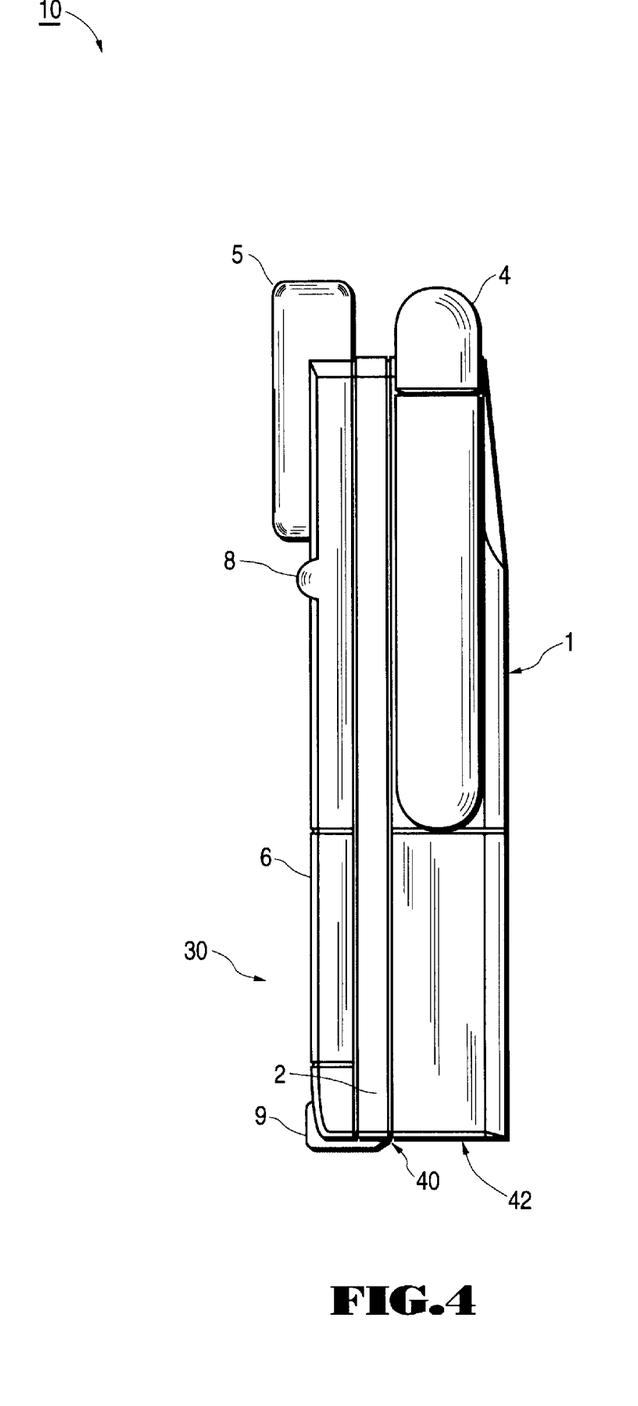
FIG. 4 is a side view of a telephone having a keypad housing in the retracted position in accordance with the present claimed invention.

In FIG. 4, the bottom surface 42 of telephone body 1 is shown. Also shown is bottom surface 40 of keypad housing 2. It can be seen that when keypad housing 2 is in the retracted position, bottom surface 40 of keypad housing 2 and bottom surface 42 of telephone body 1 are aligned such that telephone 10 has a compact profile.

Figure 5:
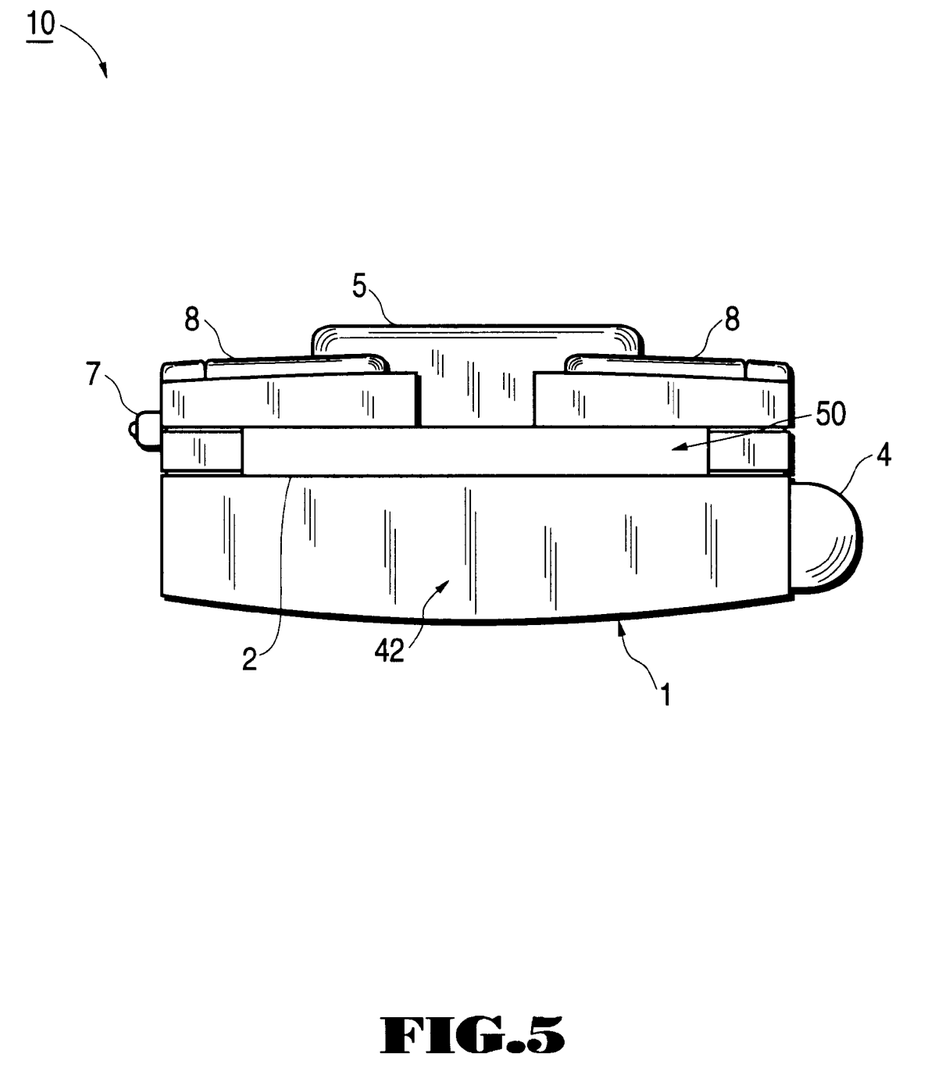
FIG. 5 is a bottom view of a telephone having the keypad housing removed in accordance with the present claimed invention.

FIG. 5 shows telephone 10 when keypad housing 2 is removed. Bottom surface 42 is shown to include a recession within telephone body 1 that extends from opening 50 into telephone body 1. Opening 50 is adapted to receive keypad housing 2 of FIGS. 1–4.

Figure 5A:
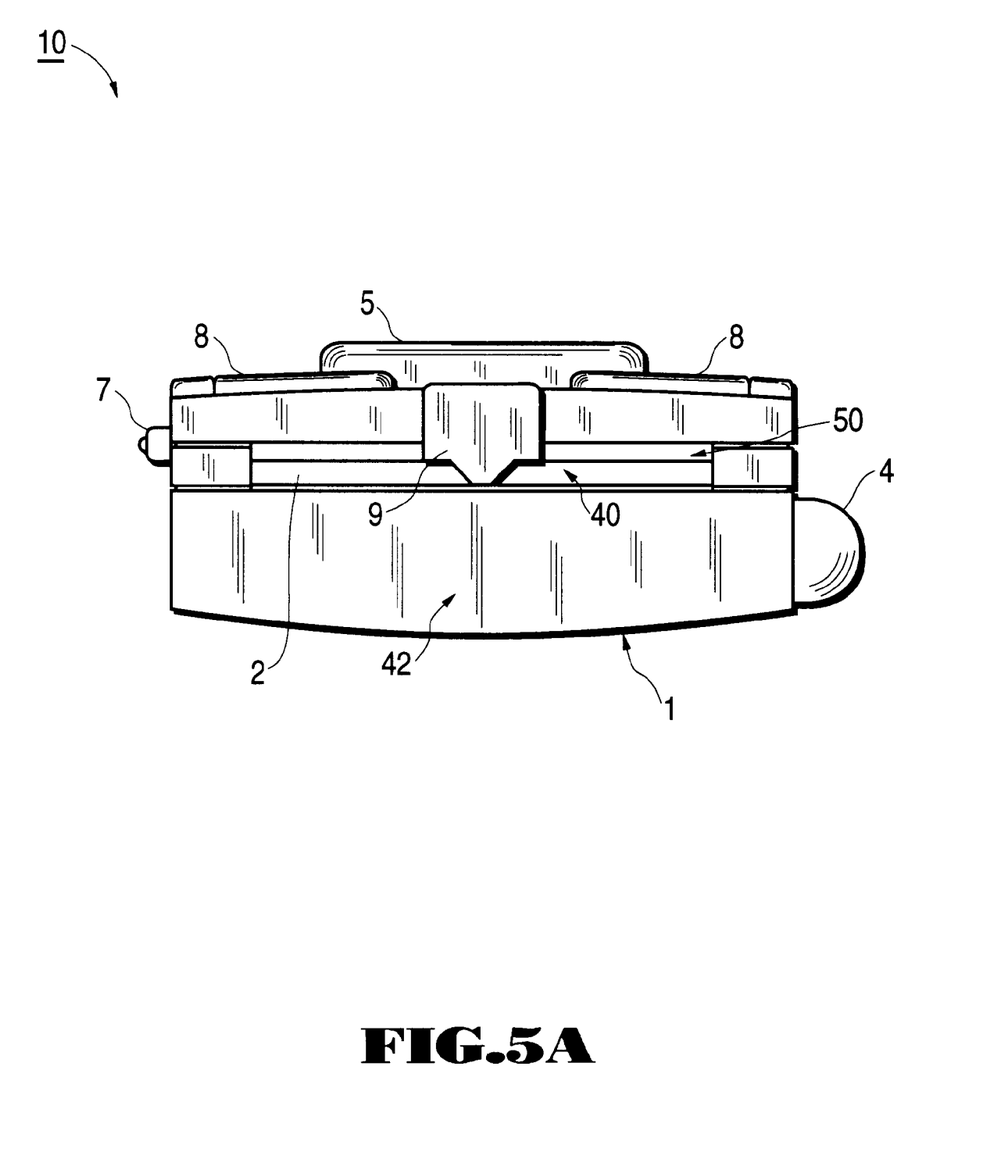
FIG. 5A is a bottom view of a telephone having a keypad housing in the retracted position in accordance with the present claimed invention.

FIG. 5A shows keypad 2 inserted within opening 50. Opening 50 receives keypad housing 2 such that keypad housing 2 slides in and out of opening 50. In the retracted position, keypad housing 2 fits within opening 50 such that keypad housing 2 fits inside the recession in telephone body 1. In the retracted position, telephone 10 has a small compact shape which easily fits within a user's pocket.

In operation, keypad housing 2 is movable from a retracted position into an extended position. In the embodiment shown in FIG. 6, the side surfaces 21–22 of keypad housing 2 act as rails which engage corresponding slots, shown as slots 61–62 within telephone body 1. Thus, slots 61–62 hold keypad 2 such that it may slide in and out of telephone body 1. That is, keypad 2 may be moved from a retracted position to an extended position.

Figure 6:
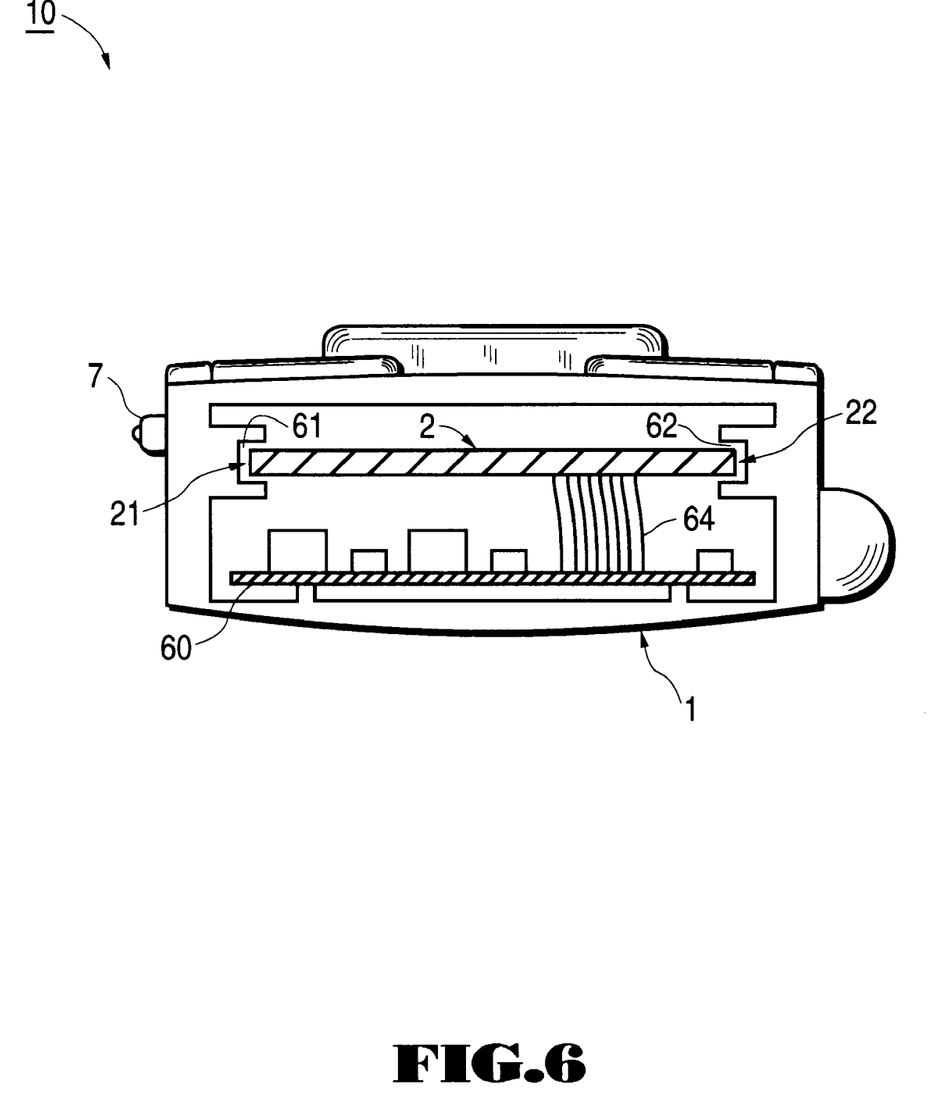
FIG. 6 is a cross sectional view along section A—A of FIG. 3 showing a telephone having a keypad housing in the retracted position in accordance with the present invention.

The electronic circuitry of telephone 10 includes a circuit board 60 and electrical cable 64. Electrical cable 64 is electrically connected to circuit board 60 and extends into keypad housing 2 for making electrical connection between circuit board 60 and keypad 3, and microphone 9. Electrical cable 64 extends and retracts so as to allow keypad housing 2 to freely move between the extended position and the retracted position.

Figure 7:
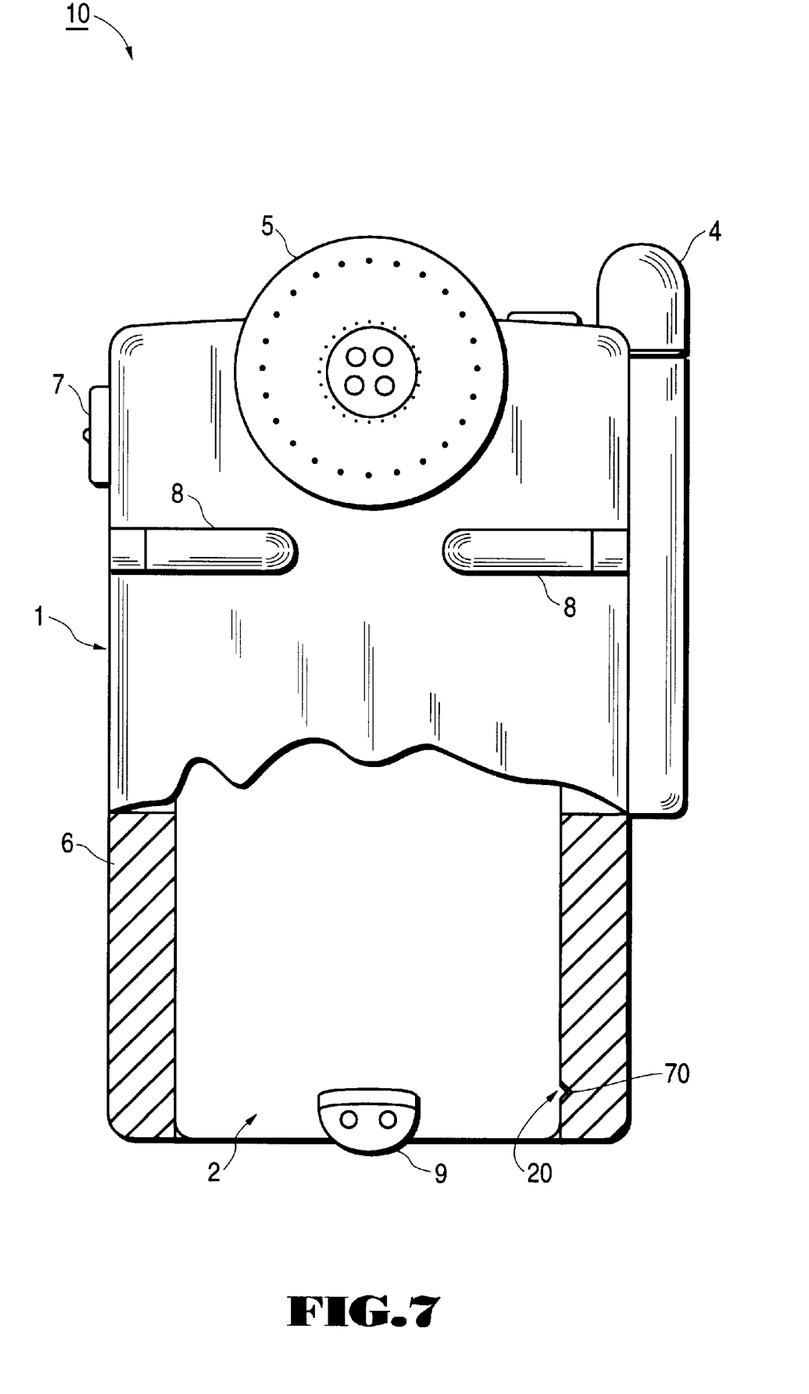
FIG. 7 is a top cut-away view of a telephone having a keypad housing in the retracted position in accordance with the present claimed invention.

As shown in FIG. 7, keypad housing 2 is held in the retracted position by the engagement of detent 20 with indentation 70 formed within telephone body 1. Upon the application of a downward force on microphone 9, detent 20 is easily disengaged from indentation 70 so as to allow keypad housing 2 to be slid downward and into the extended position.

Figure 8:
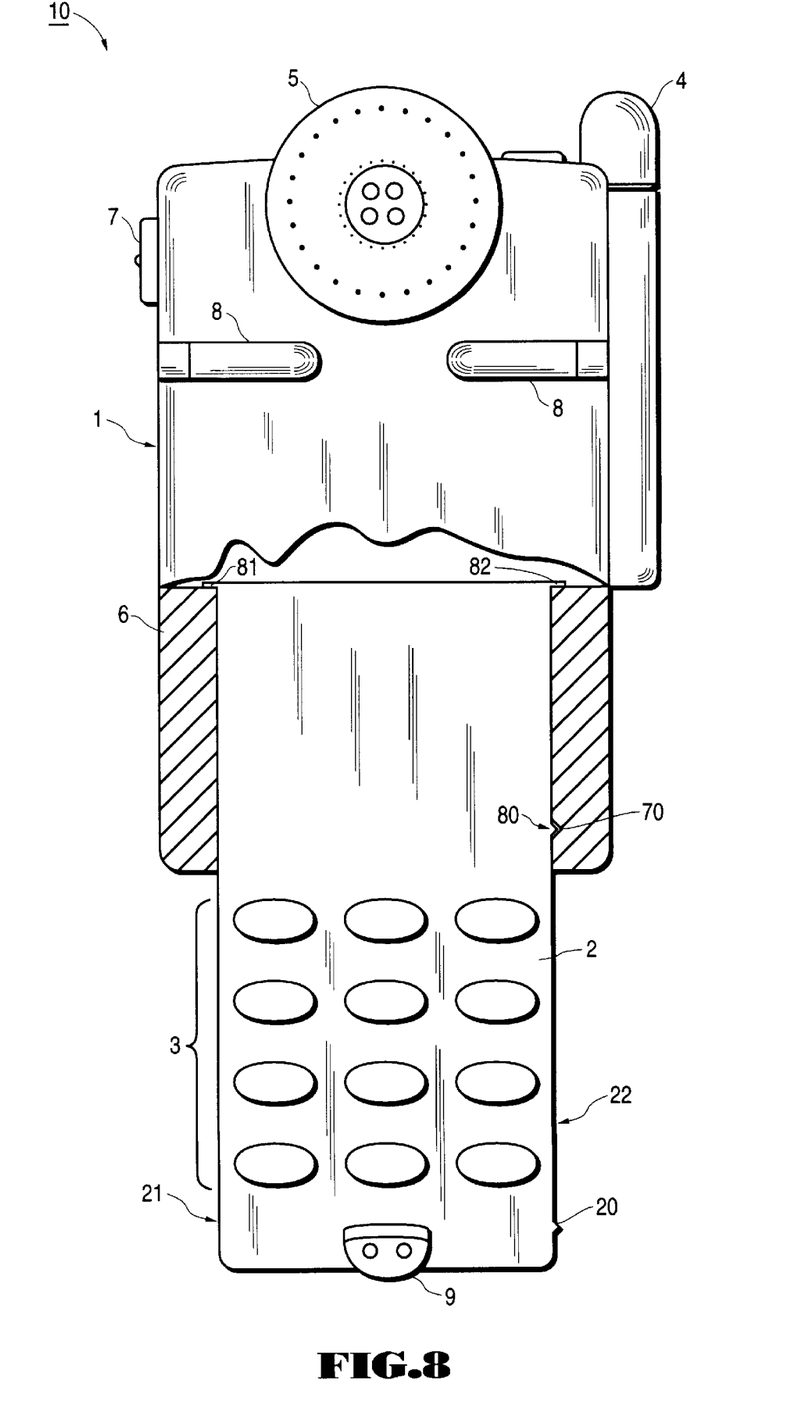
FIG. 8 is a top cut-away view of a telephone having a keypad housing in the extended position in accordance with the present claimed invention.

Referring now to FIG. 8, upon extending keypad housing 2 into the extended position, detent 80 engages indentation 70. In an embodiment where keypad housing 2 is plastic, detent 70 is a bump molded into side surface 22 of keypad housing 2. In one embodiment of the present invention, flanges 81–82 extend from side surfaces 21–22 so as to prevent keypad housing 2 from sliding completely out of telephone body 1. When a user attempts to slide keypad housing 2 past the extended position, flanges 81–82 contact telephone body 1 so as to prevent further movement of keypad housing 2.

Figure 9:
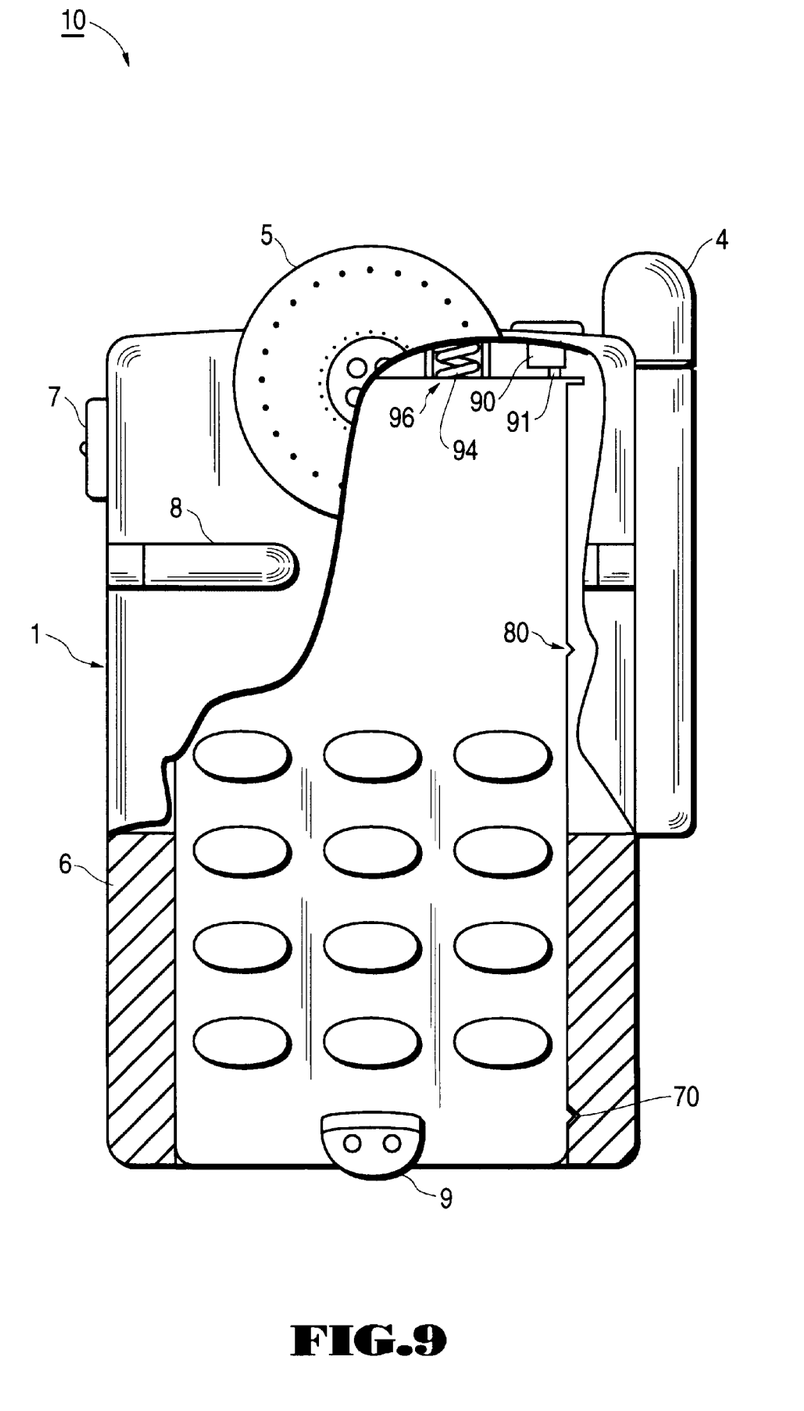
FIG. 9 is a top cut-away view of a telephone that includes a push-push latch and a spring mechanism and a keypad housing which is in the retracted position in accordance with the present claimed invention.
Figure 10:
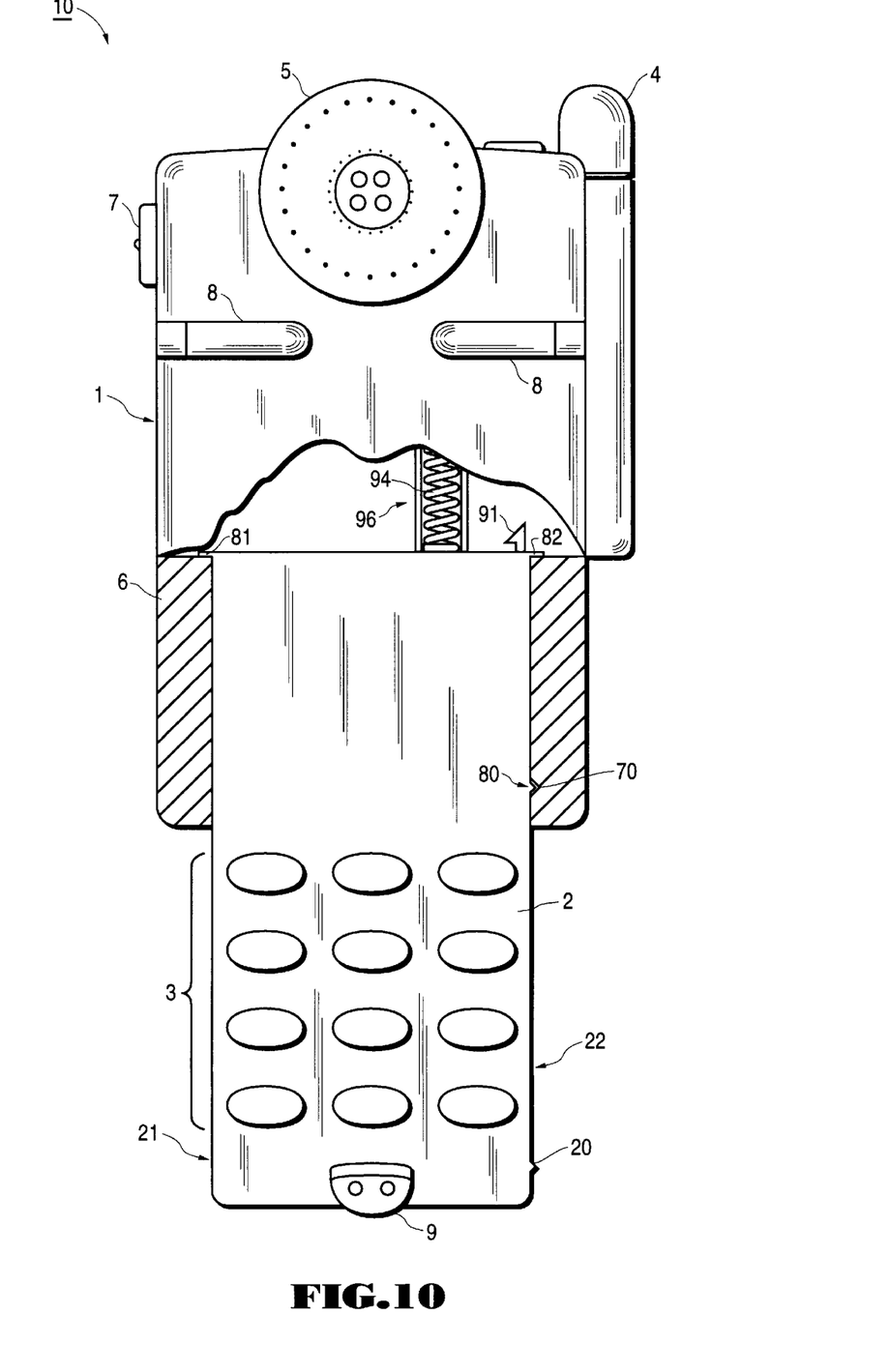
FIG. 10 is a top cut-away view of a telephone that includes a push-push latch and a spring mechanism and a keypad housing which is in the extended position in accordance with the present claimed invention.

In an alternate embodiment shown in FIGS. 9–10 a latch mechanism which includes a push-push latch 90 is used to hold keypad housing 2 in the retracted position. In one embodiment, detail 91 which is adapted to engages push-push latch 90 extends from one end of keypad housing 2. In the embodiment shown in FIGS. 9–10, a spring mechanism 96 is used to move keypad housing 2 from a retracted position into an extended position. In one embodiment, spring mechanism 96 includes a channel which contains a spring 94. Spring 94 contacts housing 1 on one end and keypad housing 2 on the opposite end such that spring 94 is compressed when keypad housing 2 is in the retracted position as shown in FIG. 9.

In operation, push-push latch 90 holds keypad housing 2 in the retracted position by engaging detail 91 which extends from keypad housing 2. When a user presses in on keypad housing 2 so as to release push-push latch 90, spring 94 applies a force to keypad housing 2 so as to automatically move keypad housing 2 into the extended position. FIG. 10 shows keypad housing 2 in the extended position. In the extended position, detent 80 engages indentation 70 so as to latch keypad 2 in the extended position. The user then may return keypad housing 2 to the retracted position by pressing keypad housing 2 into main body 1 until push-push latch 90 engages with detail 91 so as to latch keypad housing 2 in the retracted position.

In one embodiment of the present invention, keypad 3 of FIGS. 1–8 is primarily used for data input. The names and phone numbers of frequently called locations are input manually through keypad 2. The names and phone numbers are displayed on display 6. The user may scroll through the names and phone numbers by operating selection switch 7 so as to select the number to be dialed. The user then operates a function key designated as the send key in order to initiate a call to the desired location. The communications link is then disconnected by operating a function key designated as the end key. Thus, in normal operation, telephone 10 may be operated when keypad housing 2 is in the retracted position. If desired, a user may extend keypad housing 2 such that the microphone is nearer the user's mouth. However, since microphone 9 is sufficiently powerful so as to receive sound when keypad housing 2 is in the retracted position, there is usually no need to extend keypad housing 2. Thus, the operation of keypad 3 to make a call is only required in those instances where the phone number to be dialed is not stored in the telephone's memory.

In operation, the telephone is operable both in the extended position and in the retracted position. In addition, in the present embodiment, telephone 10 is useable on both the right side of a user's face and on the left side of a user's face since microphone 9 and speaker 5 are centrally aligned.

Telephone 10 is small and compact enough when keypad housing 2 is in the retracted position to easily fit within a user's pocket when keypad housing 2 is in the retracted position. In addition, the placement of keypad 3 on keypad housing 2 such that it may be contained within phone 10 leaves plenty of room for a large display, a large speaker, and function keys to be located on front surface 30.

Though telephone 10 of FIGS. 1–8 is described with reference to a cellular telephone, telephone 10 could also be a satellite phone or a Code Division Multiple Access (CDMA) phone. In one embodiment, telephone 10 is a CDMA telephone that can send and receive pages and text messages.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the Claims appended hereto and their equivalents.

We claim:

1. A compact telephone comprising:
   a telephone body having a display disposed therein and having a bottom surface, said telephone body having an opening that extends through said bottom surface and into said telephone body;
   a keypad housing disposed within said opening and having a microphone disposed therein, said keypad housing slideably coupled to said telephone body such that said keypad housing is able to be retracted into or extended from said opening in said telephone body;
   a push-push latch for selectively latching said keypad housing within said opening in said telephone body;
   a spring coupled to said keypad housing and coupled to said telephone body, said spring operable upon release of said push-push latch for extending said keypad housing from said opening in said telephone body; and
   a keypad disposed within said keypad housing and electrically coupled to said telephone body such that a user may input data into said telephone by operating said keypad when said keypad housing is extended from said opening in said telephone body.

2. The compact telephone of claim 1 wherein said compact telephone further comprises a cellular phone.

3. The compact telephone of claim 1 wherein said opening in said telephone body includes a first slot and a second slot formed so as to receive said keypad housing so as to allow said keypad housing to slide between a retracted position and an extended position.

4. The compact telephone of claim 1 wherein said keypad housing comprises a first flange and a second flange, said first flange and said second flange disposed within said keypad housing so as to engage said telephone body such that said keypad housing may not be completely removed from said telephone body.

5. The compact telephone of claim 1 wherein said keypad is a full sized keypad.

6. The compact telephone of claim 1 wherein said telephone body further comprises:
   function keys.

7. The compact telephone of claim 3 wherein said telephone body includes a indentation and wherein said keypad housing includes a first detent and a second detent, said first detent and said second detent positioned such that said first detent engages said indentation so as to hold said keypad housing in said retracted position and said second detent engages said indentation so as to hold said keypad housing in said extended position.

8. The compact telephone of claim 6 wherein said telephone body further comprises:
   a push-push latch for holding said keypad housing in the retracted position; and
   a spring coupled to said telephone body and to said keypad housing, said spring exerting a force against said keypad housing such that, upon the release of said push-push latch, said spring moves said keypad housing into said extended position.

9. A compact telephone comprising:
   a telephone body having a display disposed therein and having a bottom surface, said telephone body having an opening that extends through said bottom surface and into said telephone body;
   means for retractably extending a keypad housing from within said opening in said telephone body, said means including a push-push latch for selectively latching said keypad housing within said opening in said telephone body and said means including a spring coupled to said keypad housing and coupled to said telephone body, said spring operable upon release of said push-push latch to extend said keypad housing from said opening in said telephone body, said keypad housing having a microphone disposed therein; and
   means for data entry, said means for data entry including a keypad coupled to said keypad housing.

10. The compact telephone of claim 9 wherein said compact telephone further comprises a cellular telephone.

11. The compact telephone of claim 9 wherein said means for extending a keypad housing from within said telephone body includes a first slot and a second slot disposed so as to receive said keypad housing so as to allow said keypad housing to slide between a retracted position and an extended position.

12. The compact telephone of claim 9 wherein said keypad is a full sized keypad.

13. The compact telephone of claim 9 wherein said telephone body further comprises:
   function keys.

14. A method for entering data into a compact telephone that includes a telephone body having a display disposed therein and function keys disposed therein, said method comprising:
   extending a keypad housing from within an opening disposed within said telephone body by pushing on said keypad housing so as to release a push-push latch, said release of said push-push latch allowing a spring to extend said keypad housing so as to expose a keypad having keys disposed thereon; and
   entering data into said compact telephone by operating said keys of said keypad.

* * * * *